United States Patent
Ramanujam

(10) Patent No.: US 9,805,519 B2
(45) Date of Patent: Oct. 31, 2017

(54) PERFORMING SERVICES ON AUTONOMOUS VEHICLES

(71) Applicant: Madhusoodhan Ramanujam, Salt Lake City, UT (US)

(72) Inventor: Madhusoodhan Ramanujam, Salt Lake City, UT (US)

(*) Notice: Subject to any disclaimer, the term of this patent is extended or adjusted under 35 U.S.C. 154(b) by 35 days.

(21) Appl. No.: 14/824,086

(22) Filed: Aug. 12, 2015

(65) Prior Publication Data

US 2015/0348335 A1 Dec. 3, 2015

(51) Int. Cl.
*G07C 5/00* (2006.01)
*G05D 1/02* (2006.01)
*G05D 1/00* (2006.01)
*G06Q 10/00* (2012.01)

(52) U.S. Cl.
CPC ........... *G07C 5/006* (2013.01); *G05D 1/0088* (2013.01); *G05D 1/0225* (2013.01); *G06Q 10/00* (2013.01); *G07C 5/008* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 8,078,349 B1 | 12/2011 | Prada Gomez | |
| 9,317,033 B2* | 4/2016 | Ibanez-Guzman | G05D 1/0027 |
| 9,466,154 B2* | 10/2016 | Akselrod | G06Q 20/10 |
| 9,709,984 B2* | 7/2017 | Cudak | G05D 1/0027 |
| 2002/0165791 A1* | 11/2002 | Segawa | G06Q 10/063 705/7.29 |
| 2005/0251304 A1* | 11/2005 | Cancellara | G07C 5/008 701/31.4 |
| 2012/0083959 A1 | 4/2012 | Dolgov | |
| 2012/0083960 A1 | 4/2012 | Zhu | |
| 2014/0016826 A1 | 1/2014 | Fairfield | |
| 2014/0358353 A1* | 12/2014 | Ibanez-Guzman | G05D 1/0027 701/23 |
| 2015/0235480 A1* | 8/2015 | Cudak | G05D 1/0027 701/2 |
| 2016/0148439 A1* | 5/2016 | Akselrod | G06Q 20/10 701/23 |
| 2017/0031997 A1* | 2/2017 | Merg | G06F 17/30528 |
| 2017/0214744 A1* | 7/2017 | Neves | H04L 67/12 |

* cited by examiner

*Primary Examiner* — Krishnan Ramesh
(74) *Attorney, Agent, or Firm* — Madhusoodhan Ramanujarr

(57) ABSTRACT

Technology is described for performing services on an autonomous vehicle. The autonomous vehicle may detect that a service is to be performed on the autonomous vehicle. The autonomous vehicle may select a service center to perform the service on the autonomous vehicle. The autonomous vehicle may provide commands to drive the autonomous vehicle to the service center to enable performance of the service on the autonomous vehicle.

20 Claims, 10 Drawing Sheets

PERFORMING SERVICES ON AUTONOMOUS VEHICLES

BACKGROUND

Autonomous vehicles, such as self-driving cars, may operate with minimal or substantially no human input. For example, a passenger may enter a destination at a console of the autonomous vehicle, such as a touch screen, and the autonomous vehicle may navigate itself to the destination (e.g., a movie theater) by sensing its surrounding environment. The autonomous vehicle may sense its surroundings using a combination of sensors, cameras, radar, light detection and ranging (LIDAR), global positioning system (GPS), etc.

Autonomous vehicles offer a large number of benefits as compared to traditional automobiles. For example, autonomous vehicles may reduce traffic collisions due to the autonomous vehicle's increased reliability and improved reaction time as compared to human drivers. Autonomous vehicles may increase roadway capacity and reduce traffic congestion. In addition, passengers that are under age, elderly, disabled, intoxicated, or otherwise impaired may benefit from traveling in autonomous vehicles.

DETAILED DESCRIPTION

Figure 1:
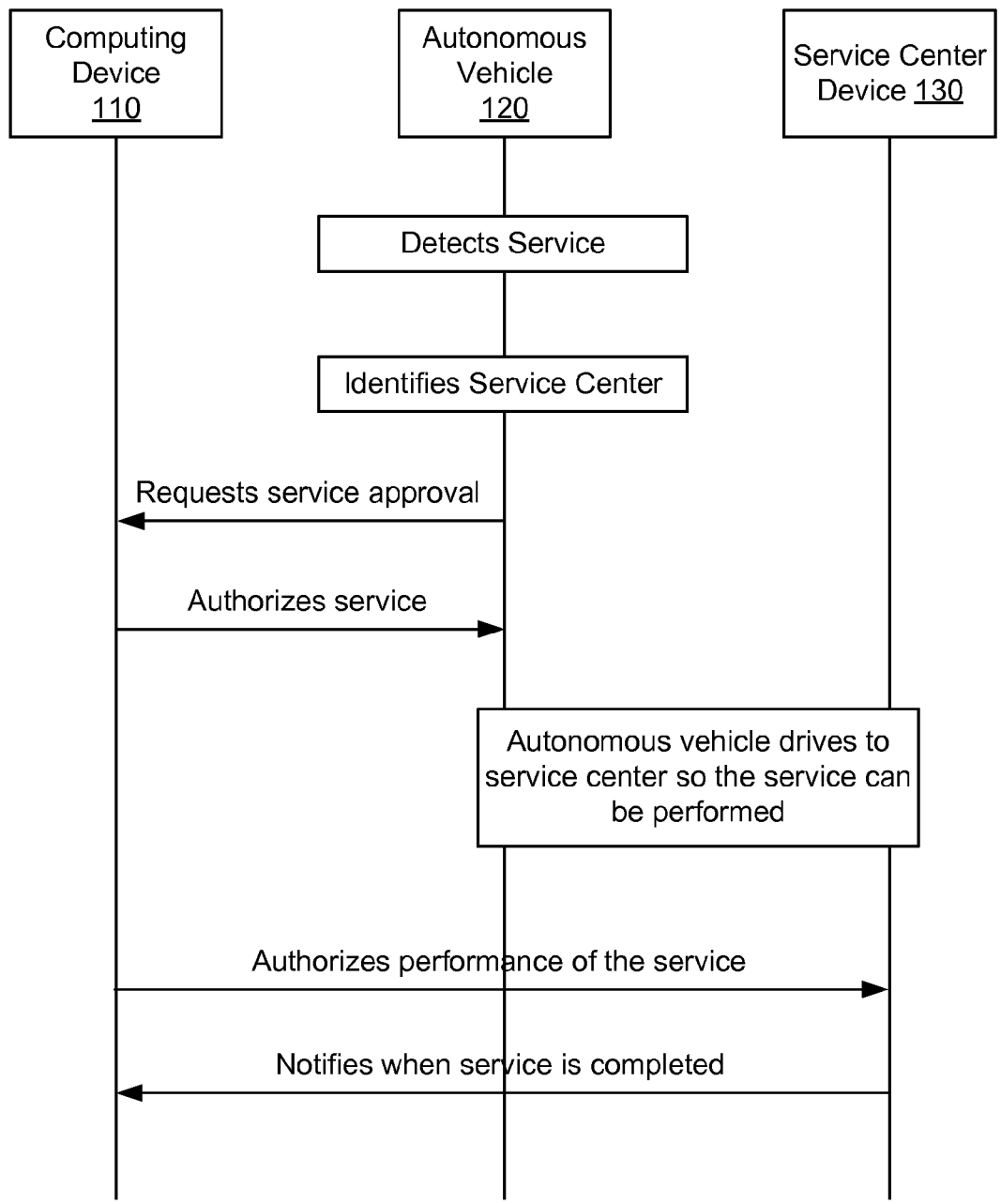
FIG. 1 illustrates operations for performing a service on an autonomous vehicle according to an example of the present technology.

Technology is described for performing a service on an autonomous vehicle. One example of an autonomous vehicle is a self-driving car or a driverless car. The autonomous vehicle may detect that a service is to be performed on the autonomous vehicle. The autonomous vehicle may select a service center to perform the service on the autonomous vehicle. The autonomous vehicle may provide commands to drive the autonomous vehicle to the service center to enable performance of the service on the autonomous vehicle.

In one example, the service to be performed on the autonomous vehicle may include refueling or recharging the autonomous vehicle. The autonomous vehicle may be gasoline-powered and the service may include filling the autonomous vehicle with gasoline. Alternatively, the autonomous vehicle may be electric-powered and the service may include recharging the autonomous vehicle's batteries. In another example, the service may include performing routine maintenance or repairs on the autonomous vehicle. As yet another example, the service may include cleaning the autonomous vehicle (e.g., at a car wash).

In one configuration, the autonomous vehicle may include internal systems that automatically detect when a service is to be performed on the autonomous vehicle. For example, the autonomous vehicle may detect when a gasoline level is below a defined threshold (e.g., below a quarter tank) or a battery level is below a defined threshold (e.g., less than 10%), and therefore, a gasoline tank of the autonomous vehicle is to be refilled or a battery of the autonomous vehicle is to be recharged, respectively. In another example, the internal systems may detect that a specific type of maintenance (e.g., a tire rotation, oil change, brake pad replacement) is to be performed on the autonomous vehicle.

In one configuration, the autonomous vehicle may detect that the service is to be performed according to a service schedule associated with the autonomous vehicle. The autonomous vehicle may maintain the service schedule and detect when a particular service is due. For example, the service schedule may indicate that the autonomous vehicle is scheduled for maintenance every three months, a car wash every six weeks, etc.

In one configuration, the autonomous vehicle may select the service center to perform the service on the autonomous vehicle. The service center may include, but is not limited to, a maintenance center for performing maintenance on the autonomous vehicle, a fuel center for refueling or recharging the autonomous vehicle, or a car wash for cleaning the autonomous vehicle. As an example, the autonomous vehicle may select a previously visited service center for performing the service on the autonomous vehicle. For example, the autonomous vehicle may select a gas station at which the autonomous vehicle previously filled up with gasoline. The autonomous vehicle may select the service center that is located in proximity to a current location. The autonomous vehicle may select the service center based on customer reviews, price, distance, etc.

In one example, the autonomous vehicle may send a notification to a user associated with the autonomous vehicle of the service to be performed on the autonomous vehicle and the service center selected to perform the service. The autonomous vehicle may send the notification to the user's computing device. The autonomous vehicle may receive an authorization from the user to drive to the service center to enable performance of the service on the autonomous vehicle. Based on the authorization received from the user, the autonomous vehicle may drive to the service center.

In one example, prior to sending the notification to the user, the autonomous vehicle may examine the user's schedule in order to identify periods of time during which the user does not need the autonomous vehicle. In addition, the autonomous vehicle may estimate an approximate amount of time involved in performing the task. The autonomous vehicle may determine the approximately amount of time to travel to the service center, wait until the service is completed, and then travel back to a previous location. If the autonomous vehicle estimates that the service is capable of being performed during a period of time that does not coincide with the user needing the autonomous vehicle for other purposes, as indicated by the schedule, then the autonomous vehicle may send the notification to the user indicating the service to be performed. If the user authorizes the service, then the autonomous vehicle may drive to the service center during the period of time during which the user does not need the autonomous vehicle.

As a non-limiting example, the autonomous vehicle may be parked in a parking space at the user's office. The autonomous vehicle may detect that a battery level for the autonomous vehicle is below a defined threshold. The autonomous vehicle may locate a charging station in proximity to the user's office. The autonomous vehicle may estimate that traveling to the charging station, recharging the autonomous vehicle, and returning back to the user's office may take approximately 30 minutes. Based on the user's schedule, the autonomous vehicle may determine that the user does not need the autonomous vehicle for the next two hours. The autonomous vehicle may send a notification to the user's computing device, wherein the notification includes a type of service to be performed (e.g., recharging the vehicle) and a selected charging station for performing the service. The user may authorize the autonomous vehicle to perform the service, and in response, the autonomous vehicle may drive to the charging station to recharge the autonomous vehicle.

When the autonomous vehicle arrives at the service center, a data matrix attached to the autonomous vehicle may be scanned by a service provider's computing device (e.g., a tablet device) at the service center. For example, the data matrix may include a quick response (QR) code or a barcode attached to the autonomous vehicle's windshield. The data matrix may store information about the user (e.g., an owner of the autonomous vehicle), such as the user's name, email address, bank information, vehicle information, service history, etc. Non-limiting examples of the service provider that works at the service center may include a fuel station attendant or a maintenance worker. In one configuration, the service provider's computing device may scan the data matrix attached to the autonomous vehicle, and the computing device may generate a message indicating that the autonomous vehicle has arrived at the service center. In addition, the message may include a request for the user to specify a type of service to be performed on the autonomous vehicle. The service provider's computing device may send the message to the user using the information about the user included in the matrix code. The message may include a digital signature or another security mechanism to prove that the sender of the message is indeed a service provider that is authenticated to provide services at the service center. In other words, security credentials included in the message may assure the user that the autonomous vehicle is being handled by an authentic service provider at the service center.

In one example, in response to the message received from the service provider's computing device, the user may reply with a message authorizing the service provider at the service center to perform the service on the autonomous vehicle based in part on the security mechanism provided by the service provider. In addition, the message may include specific instructions for the service provider when performing the service. As non-limiting examples, the instructions may be for recharging the autonomous vehicle, checking various fluids in the autonomous vehicle, etc.

In one configuration, in conjunction with the user sending the message authorizing the service to be performed, the user may instruct the autonomous vehicle to perform a task to enable the service provider to perform the service. As a non-limiting example, the user may instruct the autonomous vehicle to open a fuel door so that the autonomous vehicle can be recharged. As another example, the user may authorize the autonomous vehicle to be controlled by the service provider within a predefined area (e.g., a radius of 50 feet), so that the service provider can move the autonomous vehicle into a service garage in order to perform the service. The autonomous vehicle may receive the instructions from the user and perform a requested task accordingly.

In one example, the service provider may acknowledge the instructions received from the user and perform the service on the autonomous vehicle accordingly. The service provider may send a message to the user when the service is complete. The message may include a summary of the service performed and a cost associated with the service. The user may receive the message and authorize payment for the service. The service provider may charge the user using the billing information in the data matrix. After the service has been completed at the service center, the autonomous vehicle may drive to a previous location or a modified location as instructed by the user.

In an alternative configuration, the autonomous vehicle may detect that the service is to be performed based on instructions received from the user associated with the autonomous vehicle. For example, the user may notify the autonomous vehicle, via the user's computing device, that a particular service is to be performed on the autonomous vehicle. The instructions from the user may include a particular service center for performing the service. Based on the instructions received from the user, the autonomous vehicle may drive to the particular service center to enable performance of the service on the autonomous vehicle. In this case, the service center may already be authorized to perform the service on the autonomous vehicle. In addition, the user may previously communicate to the service center the service that is to be performed. The autonomous vehicle may automatically perform a task (e.g., open a vehicle hood) to allow the service provider at the service center to perform the task. After the service has been completed at the service center, the autonomous vehicle may drive to a previous location or a modified location as instructed by the user.

FIG. 1 illustrates operations for performing a service on an autonomous vehicle 120. The autonomous vehicle 120 may detect the service to be performed based on a service schedule or via internal systems within the autonomous vehicle 120. Non-limiting examples of the service may include refueling or recharging the autonomous vehicle 120, performing maintenance or repairs for the autonomous vehicle 120, cleaning the autonomous vehicle 120, etc. The autonomous vehicle 120 may select a service center to perform the service on the autonomous vehicle 120. For example, the autonomous vehicle 120 may select a particular gas station, electronic automobile charging station, vehicle repair center, etc. to perform the service on the autonomous vehicle 120. The autonomous vehicle 120 may select the service center based on previous service centers used to perform services on the autonomous vehicle 120. In addition, the autonomous vehicle 120 may select the service center based on customer reviews, price, distance, etc.

The autonomous vehicle 120 may request approval from the autonomous vehicle's owner (or some other authorized user associated with the autonomous vehicle 120) to drive to the service center for performance of the service. For example, the autonomous vehicle 120 may send a message to a computing device 110 associated with the autonomous vehicle's owner. The message may include details on the service to be performed and the service center selected to perform the service. The autonomous vehicle's owner may authorize, via the computing device 110, the autonomous vehicle 120 to drive to the service center for performance of the service.

In an alternative configuration, the autonomous vehicle's owner may send, via the computing device 110, a service request message to the autonomous vehicle 120. The service request message may include instructions for the autonomous vehicle 120 to drive to a particular service center at a selected time for performance of the service on the autonomous vehicle 120. In this configuration, the autonomous vehicle 120 does not independently detect the service and identify the service center, but rather is notified of the service and the service center that is to perform the service from the computing device 110.

The autonomous vehicle 120 may drive to the service center to enable performance of the service on the autonomous vehicle 120. A service provider at the service center may be authorized by the autonomous vehicle's owner to perform the service on the autonomous vehicle 120. In particular, the user's computing device 110 may send an authorization message to a service center device 130 (e.g., a mobile device) that authorizes the service provider at the service center to perform the service on the autonomous vehicle 120. The service provider may perform the service after receiving authorization from the autonomous vehicle's owner via the computing device 110. The service provider may send, via the service center device 130, a notification to the user's computing device 110 indicating that the service was successfully performed on the autonomous vehicle 120. In addition, the service provider may charge the autonomous vehicle's owner for performing the service using the service center device 130. When the service is completed, the autonomous vehicle 120 may drive to a previous location (e.g., the owner's garage, a parking lot of the owner's employer). In addition, the autonomous vehicle 120 may send a message to the computing device 110 indicating that the autonomous vehicle 120 has returned to the previous location.

Figure 2:
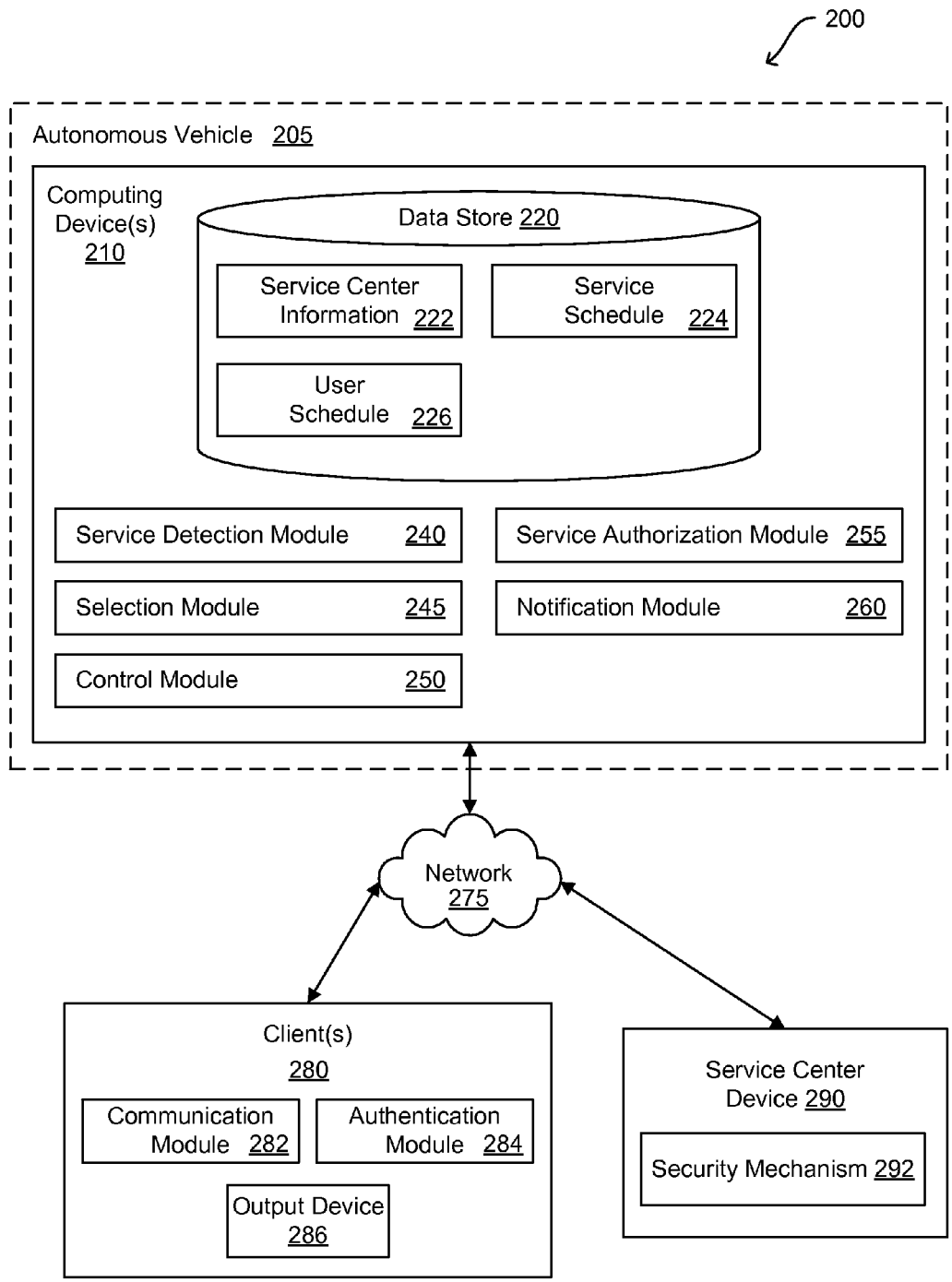
FIG. 2 is an illustration of a networked system for performing services on an autonomous vehicle according to an example of the present technology.

In the following discussion, a general description of an example system for performing services on an autonomous vehicle 205 and the system's components are provided. The general description is followed by a discussion of the operation of the components in a system for the technology. FIG. 2 illustrates a networked environment 200 according to one example of the present technology. The networked environment 200 may include one or more computing devices 210 in data communication with a client 280 by way of a network 275. In one example, the computing device 210 may be included in an autonomous vehicle 205, and the client 280 may include a mobile device of a user associated with the autonomous vehicle 205. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include service center information 222. The service center information 222 may describe a plurality of service centers. The service centers may include establishments that perform automotive services. As non-limiting examples, the service centers may include gas stations, charging stations, vehicle repair centers, vehicle maintenance centers, car wash centers, etc. The service center information 222 may list a plurality of service centers in a particular geographical region. The service center information 222 may include address information, contact information, reviews, prices, services that are performed, etc. for each of the plurality of service centers. In addition, the service center information 222 may include a list of service centers that were previously visited by the autonomous vehicle 205.

The data stored in the data store 220 may include a service schedule 224. The service schedule 224 may include scheduled services that are to be performed on the autonomous vehicle 205 (e.g., weekly or monthly). As a non-limiting example, the service schedule 224 may indicate that the autonomous vehicle 205 is to receive oil changes at a particular service center approximately every three months. In other words, the service schedule 224 may indicate periodic maintenance appointments for the autonomous vehicle 205. As another non-limiting example, the service schedule 224 may indicate that the autonomous vehicle 205 is to be recharged daily at a particular service center sometime between 2 PM and 4 PM. The service schedule 224 may be created and modified by a user associated with the autonomous vehicle 205 (e.g., the autonomous vehicle's owner). The service schedule 224 may enable the autonomous vehicle 205 to determine that a particular service is due to be performed on the autonomous vehicle 205.

The data stored in the data store 220 may include a user schedule 226. The user schedule 226 may be for a user associated with the autonomous vehicle 205 (e.g., the autonomous vehicle's owner). The user schedule 226 may indicate certain times on certain days (e.g., Thursday at 12 PM) in which the user plans to use the autonomous vehicle 205. The autonomous vehicle 205 may be unable to drive to the service center during times that the autonomous vehicle 205 is unavailable, as indicated in the user schedule 226. As a non-limiting example, the user schedule may indicate that the user uses the autonomous vehicle 205 on weekdays from 12 PM to 1 PM, and therefore, the autonomous vehicle 205 may be unavailable to drive to the service center during this time.

The components executed on the computing device 210 may include a service detection module 240, a selection module 245, a control module 250, a service authorization module 255, a notification module 260, and other applications, services, processes, systems, engines, or functionality not discussed in detail herein. The service detection module 240 may be configured to detect that a service is to be performed on the autonomous vehicle 205. The service may include refueling or recharging the autonomous vehicle 205, performing a repair on the autonomous vehicle 205, performing maintenance on the autonomous vehicle 205, cleaning the autonomous vehicle 205, or other services that may be performed on the autonomous vehicle 205. The service detection module 240 may detect the service to be performed on the autonomous vehicle 205 according to the service schedule 224. As a non-limiting example, the service detection module 240 may detect that the autonomous vehicle 205 is to receive a car wash on Monday based on contents in the service schedule 224. In one configuration, the service detection module 240 may detect the service to be performed on the autonomous vehicle 205 when one or more internal systems in the autonomous vehicle 205 generate an alert. For example, the alert may be generated when the autonomous vehicle 205 is low on fuel or is to be recharged (e.g., based on a threshold value). In addition, the alert may be generated when the autonomous vehicle's subsystems or components (e.g., brake pads, tires, air filters, transmission fluid, etc.) are to be replaced or in need of maintenance. In one configuration, the service detection module 240 may detect the service based on instructions received from the client 280 that indicate the service is to be performed on the autonomous vehicle 205.

The selection module 245 may be configured to select a service center to perform the service on the autonomous vehicle 205. The selection module 245 may select the service center based on price, types of services offered at the service center, customer reviews, a distance from a current location of the autonomous vehicle 205 to the service center, or a combination thereof. For example, the selection module 245 may select a service center within 5 miles of the autonomous vehicle's current location and having a highest rating as compared to other service centers within the same region. In addition, the selection module 245 may select a service center that has been previously used to perform services on the autonomous vehicle 205. For example, the autonomous vehicle 205 may generally visit the same maintenance center, so the selection module 245 may select the same maintenance center to perform the service. In one configuration, the selection module 245 may select the service center based on instructions from the user.

The control module 250 may be configured to provide commands to drive the autonomous vehicle 205 to the service center to enable performance of the service on the autonomous vehicle 205. In particular, the control module 250 may provide commands to the autonomous vehicle's actuators, thereby controlling steering, acceleration, braking and throttle of the autonomous vehicle 205. In one example, a route for traveling to the service center may be determined, and the control module 250 may provide commands to drive the autonomous vehicle 205 to the service center in accordance with the route. In addition, the control module 250 may provide commands for the autonomous vehicle 205 to return to a previous location when the service has been performed on the autonomous vehicle 205.

The service authorization module 255 may be configured to notify a user associated with the autonomous vehicle 205 of the service to be performed on the autonomous vehicle 205 and the service center selected to perform the service. For example, the service authorization module 255 may notify the user when an applicable service is to be performed for the autonomous vehicle 205 (e.g., vehicle maintenance, recharging of the vehicle). The service authorization module 255 may send the notification to the client 280 (or another computing device preselected by the user). The service authorization module 255 may receive an authorization from the user via the client 280 to drive to the service center to enable performance of the service on the autonomous vehicle 205. As a non-limiting example, the service authorization module 255 may notify the user that an oil change is due for the autonomous vehicle 205 and that the autonomous vehicle has tentatively scheduled an appointment at 3 PM with the service center. The service authorization module 255 may receive an authorization from the user via the client 280 to drive to the service center at 3 PM for performance of the oil change. As another non-limiting example, the service authorization module 255 may notify the user that a fuel level or a battery level of the autonomous vehicle 205 is below a defined threshold, and in response, the service authorization module 255 may receive an authorization from the user to immediately drive to a selected service center to refuel or recharge the autonomous vehicle 205.

The notification module 260 may be configured to notify a user associated with the autonomous vehicle 205 after the service has been performed. In one example, the notification module 260 may send a notification to the client 280 after the service is completed, as well as after the autonomous vehicle 205 has returned to a previous location (e.g., the user's garage, a parking lot of the user's employer). The notification may include details about the service performed on the autonomous vehicle 205, a cost associated with performing the service (e.g., a cost for parts and labor), additional comments related to the service performed on the autonomous vehicle 205, etc.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. For purposes of convenience, the computing device 210 is referred to herein in the singular. Even though the computing device 210 is referred to in the singular, it is understood that a plurality of computing devices 210 may be employed. As previously described, the computing device 210 may be operating within an autonomous vehicle 205.

The client 280 may be representative of a plurality of client devices that may be coupled to the network 275. The client 280 may comprise, for example, a processor-based system such as a computer system. Such a computer system may be embodied in the form of a laptop computer, personal digital assistants, cellular telephones, smartphones, tablet computer systems, or other devices with like capability.

The client 280 may include a communication module 282 configured to communicate with the computing device 210 in the autonomous vehicle 205. For example, the communication module 282 may send instructions for the autonomous vehicle 205 to drive to a service center to enable performance of a service on the autonomous vehicle 205. The instructions may include a location of the service center and a time for the autonomous vehicle 205 to arrive at the service center. In one configuration, the communication module 282 may communicate with a service center device 290 (e.g., a computing device) prior to performance of the service on the autonomous vehicle 205. For example, the communication module 282 may send details of the service to be performed to the service center device 290. The communication module 282 may receive a message, from a service provider at the service center via the service center device 290, which includes a security mechanism 292 indicating that the service provider is authorized to perform the service on the autonomous vehicle 205. After authorization and/or authentication of the service provider, the communication module 282 may instruct the autonomous vehicle 205 to provide limited control of the autonomous vehicle 205 to the service provider to enable the service to be performed on the autonomous vehicle 205.

The client 280 may include an authentication module 284 configured to authenticate and/or authorize the service provider at the service center to perform the service on the autonomous vehicle 205. In one example, the authentication module 284 may authenticate the service provider based on the security mechanism 292 provided by the service provider via the service center device 290. The security mechanism 292 may indicate that the service provider is authorized to perform the service on the autonomous vehicle 205. In other words, the security mechanism 292 may include a digital signature or other security measures to verify that the provider of the security mechanism 292 is indeed a service provider that is authenticated to provide services at the service center. In one example, the service provider may provide the security mechanism 292 via the service center device 290 based on a bar code on the autonomous vehicle 205 that includes an identifier (e.g., an Internet Protocol (IP) address) associated with the client 280.

The client 280 may include or be coupled to an output device 286. The output device 286 may comprise, for example, one or more devices such as cathode ray tubes (CRTs), liquid crystal display (LCD) screens, gas plasma-based flat panel displays, LCD projectors, or other types of display devices, etc.

Figure 3:
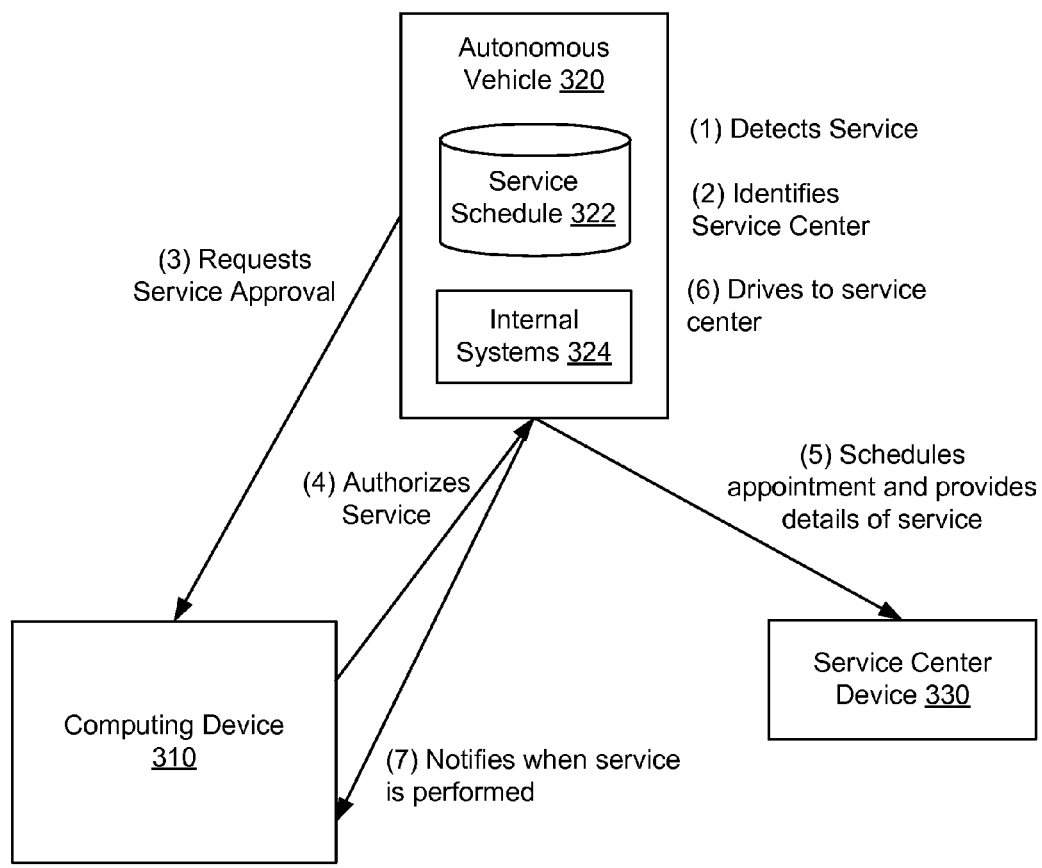
FIG. 3 illustrates a system and related operations for detecting and performing a service on an autonomous vehicle according to an example of the present technology.

FIG. 3 illustrates an exemplary system for detecting and performing a service on an autonomous vehicle 320. The autonomous vehicle 320 may detect when the service is to be performed on the autonomous vehicle 320. The service may include refueling or recharging the autonomous vehicle 320. The service may also include performing a repair on the autonomous vehicle 320, performing maintenance on the autonomous vehicle 320, cleaning the autonomous vehicle 320, etc. In one example, the autonomous vehicle 320 may detect when the service is to be performed according to a service schedule 322. The service schedule 322 may include a list of scheduled services that are to be performed on the autonomous vehicle 320. As a non-limiting example, the service schedule 322 may indicate that the autonomous vehicle 320 is to receive tire rotations at a particular service center every six months. Therefore, the service schedule 322 may indicate that a service appointment for tire rotation is scheduled on a particular day and time. As another non-limiting example, the service schedule 322 may indicate that the autonomous vehicle 320 is to be recharged daily at a particular service center from 10 AM to 11 AM. The service schedule 322 may be created and modified by a user associated with the autonomous vehicle 320 (e.g., the autonomous vehicle's owner). Therefore, based on the service schedule 322, the autonomous vehicle 320 may detect when a particular service is scheduled to be performed.

In one configuration, the autonomous vehicle 320 may detect when the service is to be performed based on a trigger from one or more internal systems 324 of the autonomous vehicle 320. For example, an internal system 324 may indicate when a fuel level or battery level of the autonomous vehicle 320 is below a defined threshold, when a tire pressure level is below a defined threshold, when an engine oil level is below a defined threshold, etc. In other words, the internal systems 324 may sense a relatively low fuel level, battery level, engine oil level, etc. and as a result, the internal systems 324 may generate an alert notifying that a particular service is due to be performed on the autonomous vehicle 320. As non-limiting examples, an internal system 324 may generate an alert when a gasoline level is less than a quarter full or when a remaining battery level is less than 10%, and the alert may trigger detection of a particular service to be performed on the autonomous vehicle 320.

After the autonomous vehicle 320 detects the service to be performed, the autonomous vehicle 320 may select a particular service center to perform the service on the autonomous vehicle 320. In one example, the autonomous vehicle 320 may select a service center that has been previously used to perform the service. As a non-limiting example, the autonomous vehicle 320 may regularly drive to a certain vehicle maintenance center in order for maintenance to be performed on the autonomous vehicle 320. If the service to be performed on the autonomous vehicle 320 relates to routine maintenance, then the autonomous vehicle 320 may identify that same vehicle maintenance center to enable performance of the current service on the autonomous vehicle 320.

In one configuration, the autonomous vehicle 320 may select the service center using service center information, which may include prices, customer reviews, service center capabilities, etc. for a plurality of service centers. For example, the autonomous vehicle 320 may identify a list of candidate service centers that are each capable of performing the service that is needed for the autonomous vehicle 320. The autonomous vehicle 320 may generate the list by searching the service center information for applicable service centers within a defined geographical region. The service center information may be locally stored at the autonomous vehicle 320 or stored on an external system located across a network. In one example, the autonomous vehicle 320 may identify relevant service centers that are within a defined distance from the autonomous vehicle's current location (e.g., service centers that are within four miles of the autonomous vehicle's current location). The autonomous vehicle 320 may narrow down the number of candidate service centers on the list based on a combination of the price, customer reviews, a distance from the autonomous vehicle's current location to the service center, or other types of information for each of the candidate service centers. From the list, the autonomous vehicle 320 may select a particular service center to perform the service on the autonomous vehicle 320.

As a non-limiting example, the autonomous vehicle 320 may detect that brake pads on the autonomous vehicle 320 have reached a defined limit and need to be replaced. The autonomous vehicle 320 may identify ten vehicle service centers that are within a defined distance (e.g., five miles) from the autonomous vehicle's current location. The autonomous vehicle 320 may determine that each of the ten vehicle service centers provide brake pad replacement services. The autonomous vehicle 320 may communicate with an external system in order to obtain service center information, such as pricing information for each of the ten vehicle service centers. In addition, the autonomous vehicle 320 may communicate with the external system in order to obtain customer review information for each of the ten vehicle service centers. Alternatively, the service center information may be locally stored at the autonomous vehicle 320. Based on the prices and the customer reviews, the autonomous vehicle 320 may select a particular vehicle service center from the list of ten vehicle service centers. In one example, the autonomous vehicle 320 may select the vehicle service center based, in part, on user settings. For example, the user settings may indicate that the autonomous vehicle 320 is to select the vehicle service center that can perform the service at a lowest price as compared to the other vehicle service centers on the list.

In one configuration, after detecting the service to be performed and identifying the service center to perform the service, the autonomous vehicle 320 may notify a user associated with the autonomous vehicle 320. The user may be an owner of the autonomous vehicle 320 or an authorized individual that is selected by the user. The autonomous vehicle 320 may send a notification to a computing device 310 associated with the user. The notification may indicate the particular service that is to be performed on the autonomous vehicle 320, as well as the service center that has been selected to perform the service. The notification may include an estimated amount of time for performing the service. In other words, the notification may be a request for the user to approve performance of the service at the selected service center. If the user approves of the service, then the user may send a message to the autonomous vehicle 320 via the computing device 310 authorizing the service to be performed. The authorization from the computing device 310 may authorize the autonomous vehicle 320 to drive to the service center for performance of the service.

In one configuration, a service appointment may be scheduled with the service center to enable performance of the service. The service appointment may be scheduled by the autonomous vehicle's user. For example, the autonomous vehicle 320 may notify the user of the service to be performed and the service center that is selected to perform the service, and in response, the user may contact the service center for scheduling an appointment time at which the service is to be performed. The user may send the appointment time to the autonomous vehicle 320. In an alternative configuration, the autonomous vehicle 320 may automatically schedule a service appointment with the service center for performing the service. For example, the autonomous vehicle 320 may send a message to a service center device 330 (e.g., a computing device located at the service center) indicating a type of service to be performed and available time frames during which the autonomous vehicle 320 is free to travel to the service center for performance of the service. The service center may reply with a message confirming that the service appointment is scheduled to be performed at a defined time.

In one configuration, the autonomous vehicle 320 may schedule the service appointment based on the user's schedule. As a non-limiting example, the schedule may indicate that the user has a doctor's appointment from 2 PM to 4 PM on Thursday during which time the user requires access to the autonomous vehicle 320, and therefore, the autonomous vehicle 320 may schedule the service appointment such that the service appointment does not conflict with user's doctor appointment. The autonomous vehicle 320 may schedule the service appointment after receiving authorization from the user via the computing device 310. When the service appointment at the service center is confirmed, the autonomous vehicle 320 may add the service appointment to a schedule of tasks to be performed by the autonomous vehicle 320. The autonomous vehicle 320 may be configured to perform the task (i.e., driving to the service center at an appointment time) in accordance with the schedule.

The autonomous vehicle 320 may drive to the service center for performance of the service after receiving authorization from the computing device 310. The autonomous vehicle 320 may or may not drive to service center in accordance with a service appointment at an appointment time. In other words, the autonomous vehicle 320 may or may not have an appointment with the service center. One or more processors of the autonomous vehicle 320 may provide commands to drive the autonomous vehicle 320 to the service center to enable performance of the service at the appointment time. The commands may be provided to the autonomous vehicle's actuators, thereby controlling steering, acceleration, braking and throttle of the autonomous vehicle 320. In one example, the autonomous vehicle 320 may determine an address, geographical coordinates, etc. associated with the service center, and then may accordingly provide instructions to drive the autonomous vehicle 320 to that location. The autonomous vehicle 320 may generate a route for traveling to the service center, and the autonomous vehicle 320 may drive to the service center according to the route.

As a non-limiting example, the autonomous vehicle 320 may send a notification to the computing device 310 indicating that the autonomous vehicle's battery level is below 10% and is to be recharged at a nearby service station. If the user approves of the service (i.e., recharging the battery), then the user may authorize the service via the computing device 310. In other words, the user may authorize the autonomous vehicle 320 to drive to the service center so that the autonomous vehicle's battery can be recharged. In some examples, depending on a type of service that has been detected, the autonomous vehicle 320 may automatically drive to the service center to enable performance of the service without requesting permission from the user. As a non-limiting example, the user may preapprove trips to the service center for purposes of recharging the autonomous vehicle's battery when the battery level is below a defined threshold, the autonomous vehicle 320 is located within a defined distance (e.g., one mile) of the service center, and the autonomous vehicle 320 does not need to be used for other commitments during that time (as indicated by the user's schedule).

The autonomous vehicle 320 may arrive at the service center and the service may be performed on the autonomous vehicle 320. After completion of the service, the autonomous vehicle 320 may send a notification to the computing device 310. The notification may verify the service performed on the autonomous vehicle 320, a cost associated with performing the service (e.g., a cost for parts and labor), and additional comments related to the service performed on the autonomous vehicle 320. In one example, the service center may provide, via the service center device 330, a notification to the computing device 310 when performance of the service is finished, and the autonomous vehicle 320 may provide another notification when the autonomous vehicle 320 has returned back to a previous location (e.g., the user's garage, a parking lot of the user's employer).

The technology described herein may enable tasks that were traditionally performed by a user (e.g., driving the vehicle for maintenance, driving the vehicle to a fuel or charge station) to be automatically performed by the autonomous vehicle 320. Since vehicles typically are parked and unused for relatively large periods of time (e.g., when the user is at work), these periods of time may be advantageously utilized for performing services on the autonomous vehicle 320. Therefore, the user is not burdened with traveling to a service center (e.g., a fuel station or a maintenance service center) and waiting for the service to be performed on the vehicle. Rather, the services may be automatically performed (with minimal instructions from the user) when the autonomous vehicle 320 is not otherwise being used.

Figure 4:
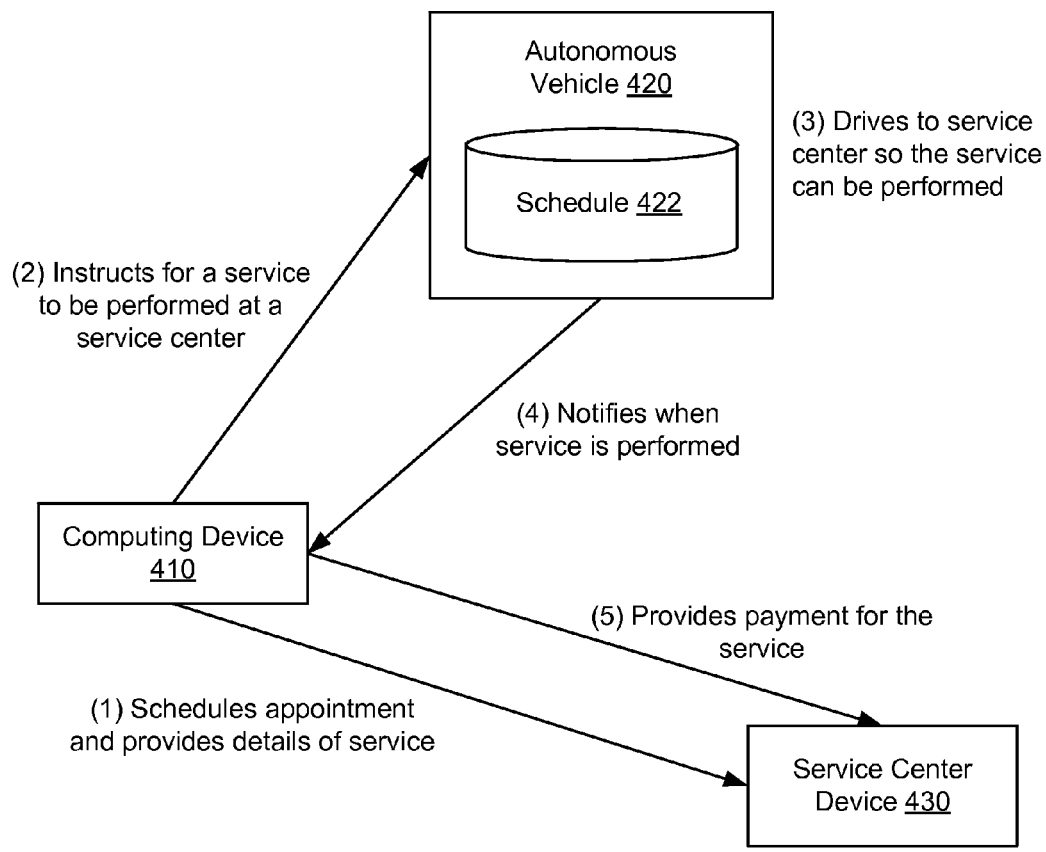
FIG. 4 illustrates a system and related operations for providing instructions to an autonomous vehicle to enable a service to be performed on the autonomous vehicle according to an example of the present technology.

FIG. 4 illustrates an exemplary system for providing instructions to an autonomous vehicle 420 to enable a service to be performed on the autonomous vehicle 420. A user associated with the autonomous vehicle 420 (e.g., the owner of the autonomous vehicle 420) may determine that a service is to be performed on the autonomous vehicle 420. The service may include refueling or recharging the autonomous vehicle 420, performing a repair on the autonomous vehicle 420, performing maintenance on the autonomous vehicle 420, cleaning the autonomous vehicle 420, etc. In addition, the user may identify a service center that is capable of performing the service. In one example, the service center may have been previously used by the user when having services performed on the autonomous vehicle 420. Examples of the service center may include, but are not limited to, gas stations, electronic automobile charging stations, vehicle repair centers, vehicle maintenance centers, car wash centers, etc.

The user may schedule a service appointment with the service center to perform the service on the autonomous vehicle 420. For example, the user may contact a service provider in the service center in order to schedule the service appointment. In particular, in order to schedule the service appointment, the user may use a computing device 410 to communicate with a service center device 430 located at the service center. In addition, the user may notify the autonomous vehicle 420 of the service appointment via the computing device 410. For example, the computing device 410 may send address information (e.g., an address, geographical coordinates) for the service center that is to perform the service on the autonomous vehicle 420. In addition, the computing device 410 may send an appointment time for the service appointment. The autonomous vehicle 420, upon receiving the notification of the service appointment from the computing device 410, may add the service appointment to a schedule 422 of tasks to be performed by the autonomous vehicle 420.

The autonomous vehicle 420 may drive to the service center for the service appointment at the appointment time in accordance with its schedule 422. In particular, one or more processors of the autonomous vehicle 420 may provide commands to drive the autonomous vehicle 420 to the service center. The autonomous vehicle 420 may drive to the service center based on the address information received from the computing device 410. For example, the autonomous vehicle 420 may generate a route for traveling to the service center based on the address information, and then provide commands to drive the autonomous vehicle 420 to the service center according to the route. The service may be performed on the autonomous vehicle 420 after the autonomous vehicle 420 arrives at the service center. Upon completion of the service, the autonomous vehicle 420 may send a notification to the computing device 410. The notification may verify that the service was performed on the autonomous vehicle 420. The autonomous vehicle 420 may send the notification upon exiting the service center and/or when the autonomous vehicle 420 has returned back to a previous location (e.g., the user's garage, a parking lot of the user's employer).

In one example, the service center may also notify the user after completion of the service. For example, the service center device 430 located at the service center may send a notification to the user's computing device 410 indicating that the service was successfully completed. The notification may include details on the service performed and a breakdown of the costs associated with performing the service. Based on the notification, the computing device 410 may authorize a payment for completion of the service using billing information associated with the autonomous vehicle's user. The computing device 410 may send payment information to the service center device 430 located at the service center.

As a non-limiting example, the autonomous vehicle's user may determine to have new tires installed on the autonomous vehicle 420. The user may identify a service center capable of installing the new tires on the autonomous vehicle 420. The user may schedule a service appointment with the service center for the tire installation. The user, via the computing device 410, may notify the autonomous vehicle 420 of the service center's location and an appointment time (e.g., Thursday at 2 PM). The autonomous vehicle 420 may add the service appointment to a schedule 422 of tasks to be performed at the autonomous vehicle 420. The autonomous vehicle 420 may drive to the service center in accordance with the schedule 422 to enable performance of the tire installation on the autonomous vehicle 420.

Figure 5:
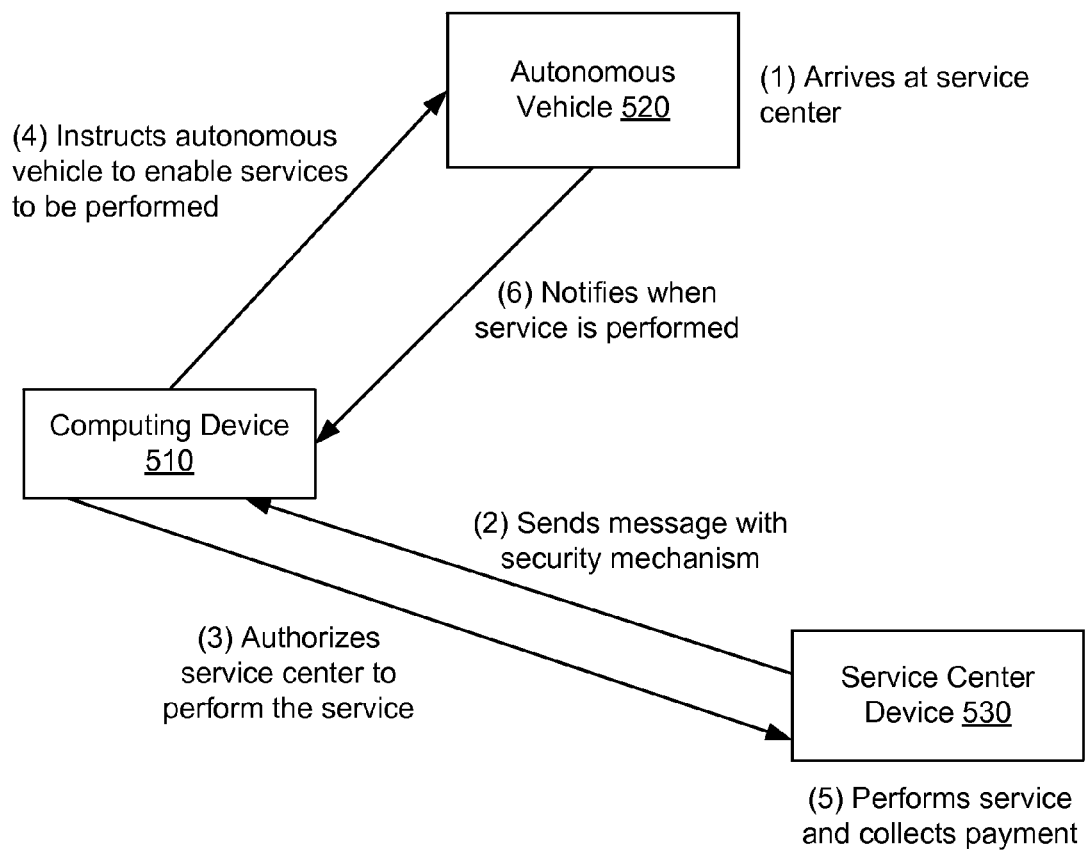
FIG. 5 illustrates a system and related operations for authenticating a service provider to perform a service on the autonomous vehicle according to an example of the present technology.

FIG. 5 illustrates an exemplary system for authenticating a service provider at a service center to perform a service on an autonomous vehicle 520. The autonomous vehicle 520 may arrive at the service center according to an appointment time during which the service is to be performed on the autonomous vehicle 520. The service provider at the service center may approach the autonomous vehicle 520. Non-limiting examples of the service provider may include a fuel station attendant, a maintenance worker, a repairman, etc. The service provider may use a service center device 530, such as a mobile device (e.g., a hand-held scanner) to read or scan a two-dimensional (2D) matrix code attached to the autonomous vehicle 520. For example, the matrix code may include a quick response (QR) code or a barcode attached to the autonomous vehicle's windshield. The matrix code may store information about the autonomous vehicle's user (e.g., an owner of the autonomous vehicle 520), such as the user's name, email address, phone number, bank information, vehicle information, etc.

The service center device 530 may scan the matrix code and generate a message to send to a computing device 510. For example, the computing device 510 may be owned or operated by the autonomous vehicle's user. The message may be a short messaging service (SMS) message, text message, electronic mail, a voice message, etc. The message may indicate that the autonomous vehicle 520 has arrived at the service center. In addition, the message may include a request for the autonomous vehicle's user to specify a type of service to be performed on the autonomous vehicle 520. In one example, the message may include sales or promotions that are currently ongoing for specific services at the service center. As a non-limiting example, the message may indicate that the service center is currently performing free car washes with an oil change. The service center device 530 may send the message to the user's computing device 510 using user identification information included in the matrix code, such as the user's email address or phone number.

In one configuration, the message from the service center device 530 may include a digital signature, an electronic signature or other security measures to prove that the sender of the message is indeed a service provider that is authenticated to provide services at the service center. In other words, the user may be assured that the autonomous vehicle 520 is being treated by an authentic service provider. Therefore, unauthorized users may be unable to use a device to scan the matrix code and send a message to the autonomous vehicle's user under false pretenses of being a legitimate service provider. In this case, an unsuspecting user may unknowingly provide the unauthorized user with access to the autonomous vehicle 520. Therefore, the security mechanism included in the message may ensure the autonomous vehicle's user that the autonomous vehicle 520 is being treated by an authorized individual at the service center.

The autonomous vehicle's user may send, via the computing device 510, an authorization message to the service center device 530 to authorize the service center to perform services on the autonomous vehicle 520. The authorization message may be sent after the message with the security mechanism is received from the service center device 530. The authorization message may specific a particular service to be performed on the autonomous vehicle 520, as well as other details about the service to be performed.

In one example, while sending the authorization message to the service center device 530, the computing device 510 may also instruct the autonomous vehicle 520 to provide limited access or control to enable performance of the service on the autonomous vehicle 520. For example, the autonomous vehicle 520 may be instructed to unlock the doors to allow the service provider access to inside the autonomous vehicle 520. In another example, the autonomous vehicle 520 may be instructed to open a fuel tank door or charging door so that the service provider can refuel or recharge the autonomous vehicle 520. In another example, the autonomous vehicle 520 may be instructed to allow the service provide to operate the autonomous vehicle 520 for purposes of driving to and from a service garage, etc. As a non-limiting example, the autonomous vehicle 520 may be driven within 50 yards with respect to an initial location after arriving at the service center.

In one example, the service center device 530 may send an acknowledgement of the user's instructions to the computing device 510. The service provider may perform the service on the autonomous vehicle 520 at the service center. The service provider may send, via the service center device 530, a message to the autonomous vehicle's user when the service is complete. The message may include a summary of the service performed and a cost associated with the service. In one example, the user's billing information may already be known (e.g., through the matrix code or from previous service transactions) and the service provider may automatically charge the user upon authorization, or alternatively, the message may request the user to provide the billing information and authorize payment. The user may receive the message and, via the computing device 510, authorize payment for the service.

In one example, the autonomous vehicle may detect when the service has been completed. For example, the computing device 510 may indicate to the autonomous vehicle 520 that the service has been completed. The autonomous vehicle 520 may automatically return to a previous location or a modified location as instructed by the autonomous vehicle's user.

In an alternative configuration, the autonomous vehicle's owner may inform the service center prior to the autonomous vehicle 520 arriving at the service center. For example, the user may schedule a time for the service to be performed. The autonomous vehicle 520 may drive to the service center and arrive at a defined time (e.g., an appointment time). The autonomous vehicle 520, upon arriving to the service center, may automatically provide limited access to a service provider at the service center. A type of limited access may depend based on the service to be performed. The service provider may perform the service on the autonomous vehicle 520, and then send a message to the autonomous vehicle's user when the service is complete. The user may authorize payment for the service, and the autonomous vehicle 520 may drive to a previous location. In this configuration, the service center device 530 does not send the message with the security mechanism to the autonomous vehicle's user. Since the user has already scheduled an appointment at the service center, the user may assume that an authorized service provider will handle the autonomous vehicle 520 after the autonomous vehicle 520 drives to the service center.

As a non-limiting example, a user may wish for the autonomous vehicle 520 to be refueled while the user is at work. Rather than the user taking the car to a gas station, the user may instruct the autonomous vehicle 520 to drive from the user's work parking area to the gas station, so that the autonomous vehicle's fuel tank can be refilled. A gas station attendant may walk up to the autonomous vehicle 520, and using the service center device 530, may scan a matrix code on the autonomous vehicle 520. The matrix code may include the autonomous vehicle's owner identification, which enables the service center device 530 to send a message to the computing device 510, which is associated with the autonomous vehicle's owner. The message may include a digital signature to ensure that an authorized service provider sent the message to the computing device 510. In response, the computing device 510 may send an authorization message to the service center device 530, which indicates that the autonomous vehicle 520 is to be refueled. In addition, the computing device 510 may instruct the autonomous vehicle 520 to open a fuel door to enable the service provider to refuel the autonomous vehicle 520. The autonomous vehicle 520 may be refueled, and then the service center device 530 may send a message (e.g., a summary of the service and a corresponding bill) to the computing device 510. The service center device 530 may send the message based on information included in the matrix code. The computing device 510 may provide payment to the gas station, and the autonomous vehicle 520 may return to the user's work parking area. Therefore, the autonomous vehicle 520 may be conveniently refilled (with minimal action from the user) during a time in which the autonomous vehicle 520 is not being used by the user.

Figure 6:
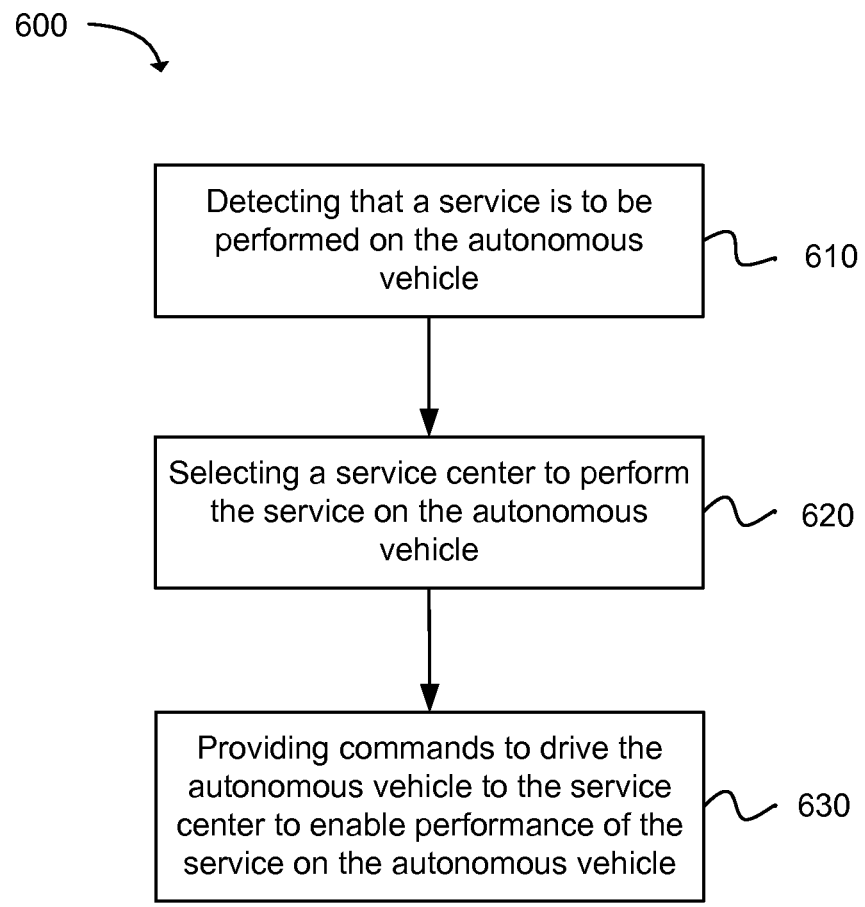
FIG. 6 is a flowchart of a method for performing services on an autonomous vehicle according to an example of the present technology.

FIG. 6 illustrates an example of a method 600 for performing services on an autonomous vehicle. The method can be executed as instructions on a machine, where the instructions are included on at least one computer readable medium or one non-transitory machine readable storage medium. The method may be executed by one or more processors on the machine. The method may include the operation of detecting that a service is to be performed on the autonomous vehicle, as in block 610. The method may include the operation of selecting a service center to perform the service on the autonomous vehicle, as in block 620. The method may include the operation of providing commands to drive the autonomous vehicle to the service center to enable performance of the service on the autonomous vehicle, as in block 630.

In one example, the method may further include the operations of notifying a user associated with the autonomous vehicle of the service to be performed on the autonomous vehicle and the service center selected to perform the service; and receiving an authorization from the user to drive the autonomous vehicle to the service center to enable performance of the service on the autonomous vehicle. In one example, the service includes at least one of: refueling or recharging the autonomous vehicle, performing a repair on the autonomous vehicle, performing maintenance on the autonomous vehicle, or cleaning the autonomous vehicle.

In one example, the service to be performed on the autonomous vehicle is detected using a service schedule. In one example, the service to be performed on the autonomous vehicle is detected when one or more internal systems of the autonomous vehicle generate an alert. In one example, the service center selected to perform the service on the autonomous vehicle has been previously used to perform services on the autonomous vehicle. In one example, the service center is selected based on at least one of: a price, customer reviews, or a distance from a current location of the autonomous vehicle.

In one example, the method may further include the operations of receiving an indication, at the autonomous vehicle, that a service provider in the service center is authorized to perform the service on the autonomous vehicle; and providing limited control of the autonomous vehicle to the service provider in the service center to enable the performance of the service on the autonomous vehicle. In one example, the method may further include the operation of scheduling an appointment with the service center in response to detecting that the service is to be performed on the autonomous vehicle. In one example, the method may further include the operation of verifying that the appointment scheduled with the service center does not conflict with a schedule of a user associated with the autonomous vehicle.

Figure 7:
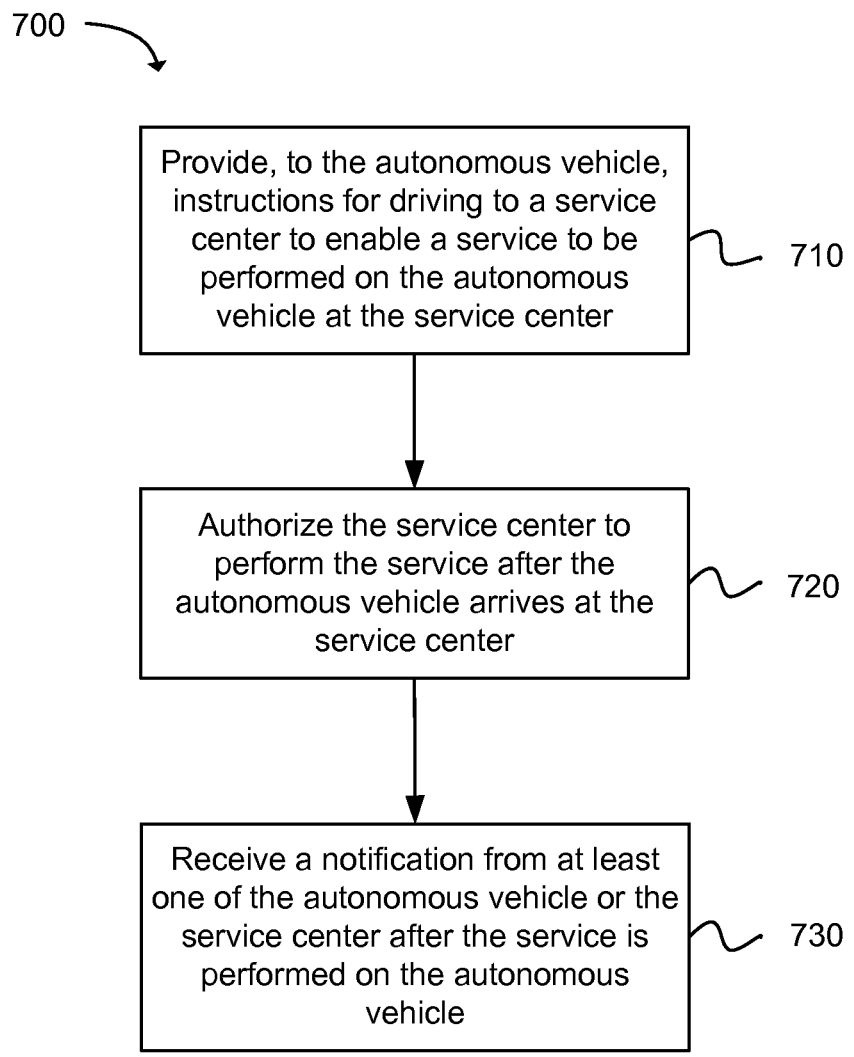
FIG. 7 depicts functionality of a mobile device operable to communicate with an autonomous vehicle according to an example of the present technology.

Another example provides functionality 700 of a mobile device operable to communicate with an autonomous vehicle, as shown in the flow chart in FIG. 7. The functionality can be implemented as a method or the functionality can be executed as instructions on a machine, where the instructions are included on at least one computer readable medium or one non-transitory machine readable storage medium. The method may be executed by one or more processors on the machine. The mobile device may be configured to provide, to the autonomous vehicle, instructions for driving to a service center to enable a service to be performed on the autonomous vehicle at the service center, as in block 710. The mobile device may be configured to authorize the service center to perform the service after the autonomous vehicle arrives at the service center, as in block 720. The mobile device may be configured to receive a notification from at least one of the autonomous vehicle or the service center after the service is performed on the autonomous vehicle, as in block 730.

In one example, the instructions provided to the autonomous vehicle include a location of the service center and a time for the autonomous vehicle to arrive at the service center. In one example, the mobile device may be configured to send, to the service center, details of the service to be performed on the autonomous vehicle, the service including at least one of: refueling or recharging the autonomous vehicle, performing a repair on the autonomous vehicle, performing maintenance on the autonomous vehicle, or cleaning the autonomous vehicle.

In one example, the mobile device may be configured to receive a message, from the service center, that includes a security mechanism indicating that a service provider at the service center is authorized to perform the service on the autonomous vehicle; and authenticate the service provider at the service center to perform the service on the autonomous vehicle based in part on the security mechanism provided by the service provider. In one example, the mobile device may be configured to instruct the autonomous vehicle to provide limited control of the autonomous vehicle after the service provider at the service center is authenticated, wherein the limited control enables the service provider to perform the service on the autonomous vehicle. In one example, the mobile device may be configured to receive the message including the security mechanism from the service provider based, in part, on a bar code attached to the autonomous vehicle, wherein the bar code includes an identifier associated with the mobile device.

Figure 8:
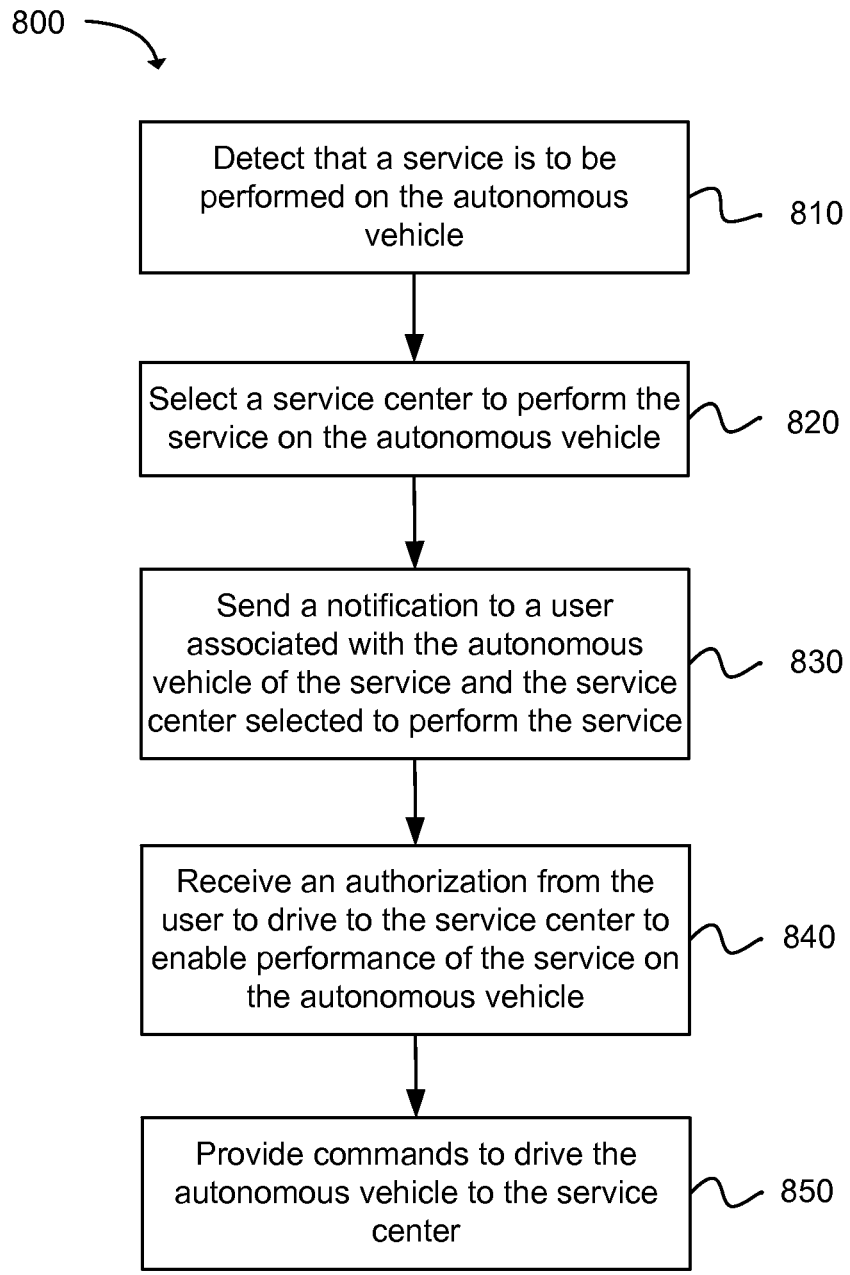
FIG. 8 depicts functionality of an autonomous vehicle according to an example of the present technology.

Another example provides functionality 800 of an autonomous vehicle, as shown in the flow chart in FIG. 8. The functionality can be implemented as a method or the functionality can be executed as instructions on a machine, where the instructions are included on at least one computer readable medium or one non-transitory machine readable storage medium. The method may be executed by one or more processors on the machine. The autonomous vehicle may be configured to detect that a service is to be performed on the autonomous vehicle, as in block 810. The autonomous vehicle may be configured to select a service center to perform the service on the autonomous vehicle, as in block 820. The autonomous vehicle may be configured to send a notification to a user associated with the autonomous vehicle of the service and the service center selected to perform the service, as in block 830. The autonomous vehicle may be configured to receive an authorization from the user to drive to the service center to enable performance of the service on the autonomous vehicle, as in block 840. The autonomous vehicle may be configured to provide commands to drive the autonomous vehicle to the service center, as in block 850.

In one example, the autonomous vehicle may select the service center based on services that were previously performed on the autonomous vehicle at the service center; or select the service center based on at least one of: a price, customer reviews, or a distance from a current location of the autonomous vehicle. In one example, the autonomous vehicle may notify a user associated with the autonomous vehicle when the service has been performed and the autonomous vehicle has returned to a previous location. In one example, the autonomous vehicle may detect that the service is to be performed on the autonomous vehicle according to a service schedule; or detect that the service is to be performed when one or more internal systems of the autonomous vehicle generate an alert.

Figure 9:
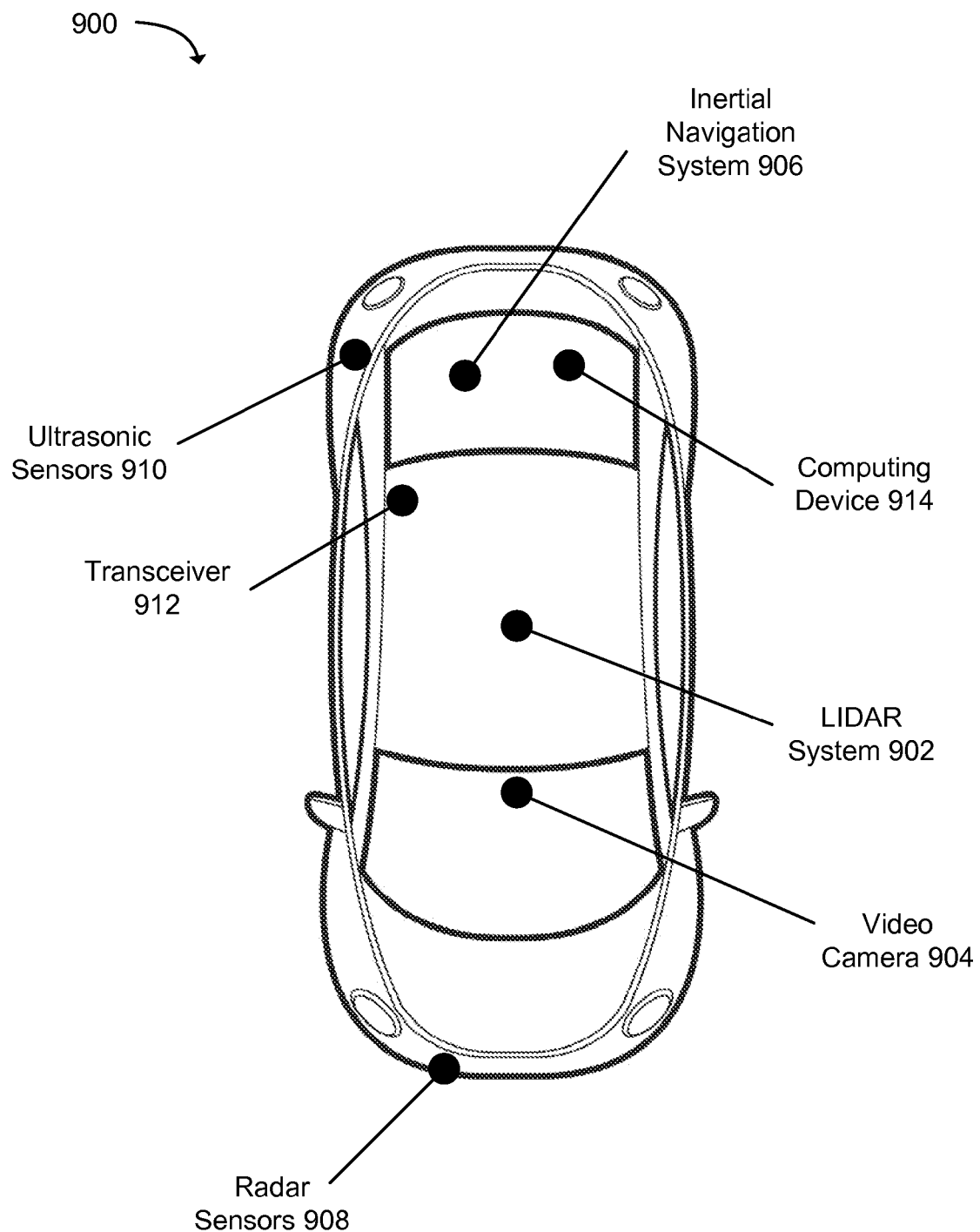
FIG. 9 illustrates an autonomous vehicle according to an example of the present technology.

FIG. 9 illustrates an example of an autonomous vehicle 900 that is capable of sensing a surrounding environment and navigating itself to a destination. The autonomous vehicle 900 may be classified as a "Level 0" autonomous vehicle, a "Level 1" autonomous vehicle, a "Level 2" autonomous vehicle, a "Level 3" autonomous vehicle, or a "Level 4" autonomous vehicle. In Level 0, a driver may control the autonomous vehicle 900 at substantially all times. The driver may be in complete and sole control of primary vehicle controls, such as brake, steering, throttle and motive power. In Level 1, one or more individual controls may be automated in the autonomous vehicle 900, such as electronic stability control or automatic braking, in which the vehicle may automatically assist with braking to enable the driver to regain control of the vehicle or stop faster than possible by acting alone. In Level 2, at least two controls may be automated in unison in the autonomous vehicle 900, such as adaptive cruise control in combination with lane keeping. In Level 3, the driver may cede full control of substantially all safety-critical functions to the autonomous vehicle 900 under certain traffic or environmental conditions. The autonomous vehicle 900 may sense when certain conditions necessitate the driver to retake control of the autonomous vehicle 900 and a sufficiently comfortable transition time may be provided for the driver to retake control of the autonomous vehicle 900. In Level 4, the autonomous vehicle 900 may perform substantially all safety-critical driving functions and monitor roadway conditions for an entire trip. The driver may provide destination or navigation input, but the driver may not be expected to control the autonomous vehicle 900 at any time during the trip. As the autonomous vehicle 900 may control all functions from start to stop, including parking functions, in level 4, the autonomous vehicle 900 may include both occupied and unoccupied vehicles. In one example, the autonomous vehicle 900 may be restricted to operating in certain environments or under certain conditions based on government regulations.

The autonomous vehicle 900 may include, but is not limited to, cars, trucks, motorcycles, buses, recreational vehicles, golf carts, trains, and trolleys. The autonomous vehicle 900 may include an internal combustion engine that operates using liquid fuels (e.g., diesel, gasoline). Alternatively, the autonomous vehicle 900 may include one or more electric motors that operate using electrical energy stored in batteries. The autonomous vehicle 900 may include, but is not limited to, a light detection and ranging (LIDAR) system 902, a video camera 904, an inertial navigation system 906, radar sensors 908, ultrasonic sensors 910, a transceiver 912, and a computing device 914 that, while working together in combination, enable the autonomous vehicle 900 to sense the environment and navigate to the destination with reduced user input. The autonomous vehicle 900 may use information captured by the various sensors, cameras, etc. to safely drive the autonomous vehicle 900 along a route to a destination, while avoiding obstacles and obeying traffic laws. The autonomous vehicle 900 may perform a series of steps when following the route to the destination. For example, the autonomous vehicle 900 may drive 500 meters, turn right, drive 1000 meters, turn left, etc. in order to reach the destination.

The LIDAR system 902 (also known as a laser range finder) may be mounted onto a surface (e.g., a top surface) of the autonomous vehicle 900. The LIDAR system 902 may emit a plurality of light pulses and measure an amount of time for the light pulses to return to the autonomous vehicle 900, thereby allowing the LIDAR system 902 to measure the distance of objects surrounding the autonomous vehicle 900. As a non-limiting example, the LIDAR system 902 may measure the distance of objects within 200 meters from the autonomous vehicle 900.

One or more video cameras 904 may be mounted to a front, rear or side portion of the autonomous vehicle 900. The autonomous vehicle 900 may use the LIDAR system 902 and the video camera 904 to build a three-dimensional (3D) map of the autonomous vehicle's surroundings. The 3D map may capture a 360-degree view around the autonomous vehicle 900. In one example, the 3D map may capture the autonomous vehicle's surroundings within 200 meters. The 3D map may include a variety of features, such as road edges, road signs, lane markings, guardrails, overpasses, etc. The 3D map may indicate stationary objects, such as buildings, telephone poles, mailboxes, etc. In addition, the 3D map may indicate moving objects, such as other vehicles, bicyclists, pedestrians, etc.

In one example, the 3D map generated using the LIDAR system 902 and the video camera 904 may be correlated with high-resolution maps of the world. The high-resolution maps may indicate lane markings, terrain, elevation, speed limits, and other features related to the route taken by the autonomous vehicle 900 when driving to the destination. In addition, the autonomous vehicle 900 may position or localize itself within the 3D map. In other words, the autonomous vehicle 900 may determine its position in relation to the objects included in the 3D map. The autonomous vehicle 900 may determine its position by using the inertial navigation system 906. The inertial navigation system 906 may calculate a position, orientation, and velocity (i.e., direction and speed of movement) of the autonomous vehicle 900.

The inertial navigation system 906 may include a combination of gyroscopes, altimeters, tachometers, gyroscopes and other motion-sensing devices in order to calculate the autonomous vehicle's position. The inertial navigation system 906 may determine an initial position and velocity, and thereafter compute the autonomous vehicle's updated position and velocity by integrating information received from the motion-sensing devices. In one example, a GPS receiver (not shown in FIG. 9) may provide the initial position of the autonomous vehicle 900 (e.g., latitude, longitude, altitude). Thereafter, the autonomous vehicle 900 may use the inertial navigation system 906 to determine its position in relation to the objects on the 3D map. As the autonomous vehicle 900 drives to the destination, updated positional information from the inertial navigation system 906 may continually update the 3D map of the autonomous vehicle's surroundings.

The radar sensors 908 may be mounted on front, rear and/or side sections of the autonomous vehicle 900. The radar sensors 908 may monitor a position of proximately-located vehicles on the road, such as vehicles immediately behind or in front of the autonomous vehicle 900. In addition, ultrasonic sensors 910 may be used to measure a distance to proximately-located objects, such as curbs or other vehicles when the autonomous vehicle 900 is parking. The radar sensors 908 and the ultrasonic sensors 910 may be used when generating and updating the 3D map of the autonomous vehicle's surroundings. For example, the radar sensors 908 and the ultrasonic sensors 910 may detect objects that are located in proximity to the autonomous vehicle 900 and those objects may be included in the 3D map of the autonomous vehicle's surroundings.

The transceiver 912 may allow the autonomous vehicle 900 to communicate with other devices or systems when driving to the destination. For example, the transceiver 912 may communicate with other vehicles on the road using vehicle-to-vehicle (V2V) communication. V2V communication may use dedicated short-range communications (DSRC) and operate in the 5.9 GHz frequency range. The range for V2V communication may be approximately 300 meters. In addition, the transceiver 912 may communicate with computing devices (e.g., mobile phones, tablet computers) that provide instructions to the autonomous vehicle 900 via wireless communication standards, such as Third Generation Partnership Project (3GPP) Long Term Evolution (LTE), Wi-Fi, WiMAX, Bluetooth, etc. The above list of wireless communication standards is non-limiting and is intended to include related wireless communication standards that are forthcoming In one example, the transceiver 912 may enable the autonomous vehicle 900 to receive messages from the computing devices, such as messages requesting a pickup, messages instructing the autonomous vehicle 900 to perform a particular task, etc.

The computing device 914 may receive information collected and/or generated from the LIDAR system 902, the video cameras 904, the inertial navigation system 906, the radar sensors 908, the ultrasonic sensors 910, and the transceiver 912. The computing device 914 may process the information (e.g., the 3D map of the vehicle's surroundings) in real-time and determine whether to modify the autonomous vehicle's current velocity and orientation in response to the sensed environment. The computing device 914 may use the received information in order to provide commands to the autonomous vehicle's actuators, thereby controlling steering, acceleration, braking and throttle of the autonomous vehicle 900. The computing device 914 may perform the tasks of localization, 3D mapping, obstacle avoidance, path planning, etc. multiple times per second until the autonomous vehicle 900 reaches the destination. In addition, the computing device 914 may include a data store that stores various types of information, such as road speed limits, traffic accidents, road construction work, etc. The computing device 914 may receive the information from a server via the transceiver 912. The computing device 914 may use the various types of information received from the server for making intelligent decisions when guiding the autonomous vehicle 900 to the destination.

In one example, the computing device 914 or a portion of the computing device 914 may be in idle mode (e.g., a low power mode or a standby mode) when the autonomous vehicle 900 is shut off For example, the computing device 914 may be in idle mode when the autonomous vehicle 900 is parked in a parking space. The computing device 914 may periodically check for messages that are received when the computing device 914 is in idle mode. For example, the computing device 914 may periodically check for messages received from a mobile device. The computing device 914 may transition from idle mode into an on mode upon receiving a message that instructs the autonomous vehicle 900 to perform a task (e.g., drive to a destination). In one configuration, the computing device 914 or the portion of the computing device 914 may be powered via energy harvesting when in idle mode. For example, the computing device 914 may derive energy from external sources in order to receive messages from the device. The external sources may include, but is not limited to, solar power, battery power, thermal power, wind energy, and kinetic energy.

Figure 10:
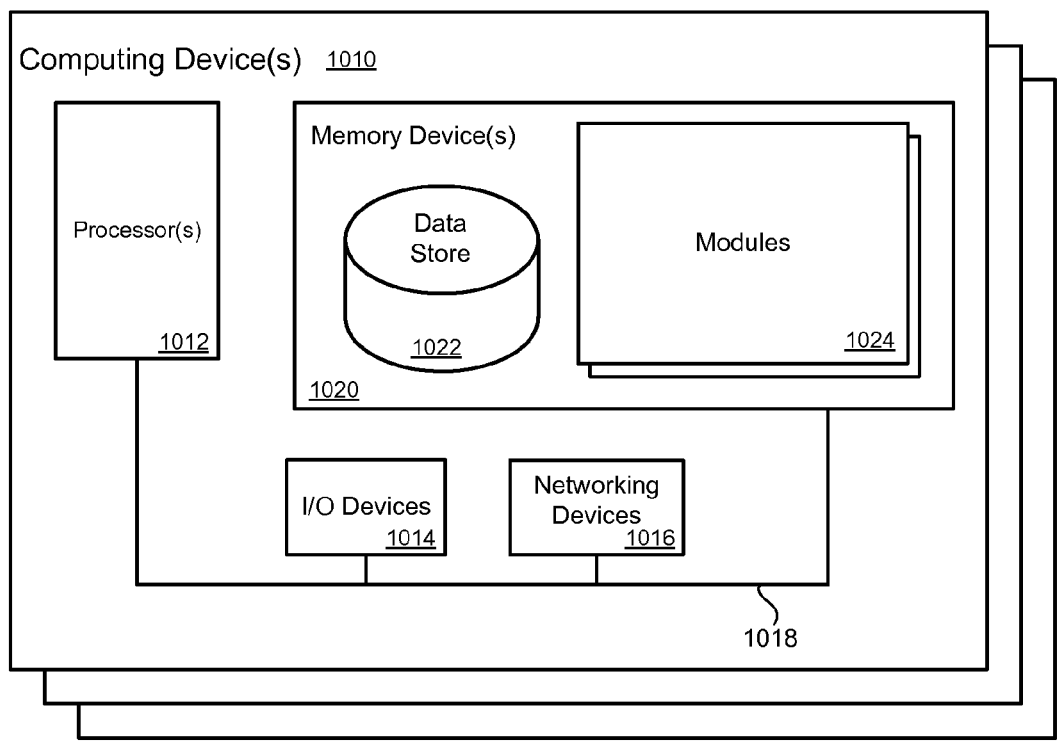
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. At least one non-transitory machine readable storage medium having instructions embodied thereon for performing services on an autonomous vehicle, the instructions when executed by one or more processors of the autonomous vehicle perform the following:
    detecting that a service is to be performed on the autonomous vehicle;
    selecting a service center for performance of the service on the autonomous vehicle;
    providing commands to drive the autonomous vehicle to the service center;
    receiving, after the autonomous vehicle has arrived at the service center, a confirmation that indicates a service provider in the service center is authorized to perform the service on the autonomous vehicle; and
    providing, in response to the confirmation, access to the autonomous vehicle to enable the service provider in the service center to perform the service on the autonomous vehicle, wherein the access to the autonomous vehicle is restricted at the service center and based on the service to be performed on the autonomous vehicle.

2. The at least one non-transitory machine readable storage medium of claim 1, further comprising instructions which when executed by the one or more processors of the autonomous vehicle performs the following:
    notifying a user associated with the autonomous vehicle of the service to be performed on the autonomous vehicle and the service center selected to perform the service; and
    receiving an authorization from the user to drive the autonomous vehicle to the service center to enable performance of the service on the autonomous vehicle.

3. The at least one non-transitory machine readable storage medium of claim 1, wherein the service includes at least one of: refueling or recharging the autonomous vehicle, performing a repair on the autonomous vehicle, performing maintenance on the autonomous vehicle, or cleaning the autonomous vehicle.

4. The at least one non-transitory machine readable storage medium of claim 1, wherein the service to be performed on the autonomous vehicle is detected using a service schedule.

5. The at least one non-transitory machine readable storage medium of claim 1, wherein the service to be performed on the autonomous vehicle is detected when one or more internal systems of the autonomous vehicle generate an alert.

6. The at least one non-transitory machine readable storage medium of claim 1, wherein the service center selected for performance of the service on the autonomous vehicle has been previously used to perform services on the autonomous vehicle.

7. The at least one non-transitory machine readable storage medium of claim 1, wherein the service center is selected based on at least one of: a price, customer reviews, or a distance from a current location of the autonomous vehicle.

8. The at least one non-transitory machine readable storage medium of claim 1, further comprising instructions which when executed by the one or more processors of the autonomous vehicle performs the following: scheduling an appointment with the service center in response to detecting that the service is to be performed on the autonomous vehicle.

9. The at least one non-transitory machine readable storage medium of claim 8, further comprising instructions which when executed by the one or more processors of the autonomous vehicle performs the following: verifying that the appointment scheduled with the service center does not conflict with a schedule of a user associated with the autonomous vehicle.

10. An autonomous vehicle, comprising:
a processor;
a memory device including a data store to store a plurality of data and instructions that, when executed by the processor, cause the processor to:
detect that a service is to be performed on the autonomous vehicle;
select a service center for performance of the service on the autonomous vehicle;
send a notification to a user associated with the autonomous vehicle of the service and the service center selected for performance of the service;
receive an authorization from the user to drive to the service center to enable performance of the service on the autonomous vehicle;
provide commands to drive the autonomous vehicle to the service center;
receive, after the autonomous vehicle has arrived to the service center, a confirmation that indicates a service provider in the service center is authorized to perform the service on the autonomous vehicle; and
provide, in response to the confirmation, access to the autonomous vehicle to enable the service provider in the service center to perform the service on the autonomous vehicle, wherein the access to the autonomous vehicle is restricted at the service center and based on the service to be performed on the autonomous vehicle.

11. The autonomous vehicle of claim 10, wherein the plurality of data and instructions, when executed by the processor, cause the processor to:
select the service center based on services that were previously performed on the autonomous vehicle at the service center; or
select the service center based on at least one of: a price, customer reviews, or a distance from a current location of the autonomous vehicle.

12. The autonomous vehicle of claim 10, wherein the plurality of data and instructions, when executed by the processor, cause the processor to: notify a user associated with the autonomous vehicle when the service has been performed and the autonomous vehicle has returned to a previous location.

13. The autonomous vehicle of claim 10, wherein the plurality of data and instructions, when executed by the processor, cause the processor to:
detect that the service is to be performed on the autonomous vehicle according to a service schedule; or
detect that the service is to be performed when one or more internal systems of the autonomous vehicle generate an alert.

14. The autonomous vehicle of claim 10, wherein the service includes at least one of: refueling or recharging the autonomous vehicle, performing a repair on the autonomous vehicle, performing maintenance on the autonomous vehicle, or cleaning the autonomous vehicle.

15. The autonomous vehicle of claim 10, wherein the plurality of data and instructions, when executed by the processor, cause the processor to: schedule an appointment with the service center in response to detecting that the service is to be performed on the autonomous vehicle.

16. The autonomous vehicle of claim 10, wherein the plurality of data and instructions, when executed by the processor, cause the processor to: verify that the appointment scheduled with the service center does not conflict with a schedule of a user associated with the autonomous vehicle.

17. An autonomous vehicle, comprising:
a processor;
a memory device including a data store to store a plurality of data and instructions that, when executed by the processor, cause the processor to:
receive, from a mobile device, instructions for driving the autonomous vehicle to a service center to enable a service to be performed on the autonomous vehicle at the service center, wherein the instructions include a location of the service center and a time for the autonomous vehicle to arrive at the service center;
provide commands to drive the autonomous vehicle to the service center in accordance with the instructions received from the mobile device;
receive, after the autonomous vehicle has arrived at the service center, a confirmation from the mobile device that indicates a service provider in the service center is authorized to perform the service on the autonomous vehicle; and
provide, in response to the confirmation, access to the autonomous vehicle to enable the service provider in the service center to perform the service on the autonomous vehicle, wherein the access to the autonomous vehicle is restricted at the service center and based on the service to be performed on the autonomous vehicle.

18. The autonomous vehicle of claim 17, wherein the plurality of data and instructions, when executed by the processor, cause the processor to: send a notification to the mobile device after the service is performed on the autonomous vehicle.

19. The autonomous vehicle of claim 17, wherein the service includes at least one of: refueling or recharging the autonomous vehicle, performing a repair on the autonomous vehicle, performing maintenance on the autonomous vehicle, or cleaning the autonomous vehicle.

20. The autonomous vehicle of claim 17, wherein the plurality of data and instructions, when executed by the processor, cause the processor to: provide commands to drive the autonomous vehicle to a previous location after the service is performed on the autonomous vehicle at the service center.

* * * * *